(12) United States Patent
Dagher et al.

(10) Patent No.: US 8,531,292 B2
(45) Date of Patent: Sep. 10, 2013

(54) COMPOSITE ANTI-TAMPER CONTAINER WITH EMBEDDED DEVICES

(75) Inventors: Habib J. Dagher, Veazie, ME (US); Fred Hewitt Smith, Belmont, MA (US)

(73) Assignees: University of Maine System Board of Trustees, Bangor, ME (US); Angel Secure Networks, Inc., Old Town, ME (US)

( * ) Notice: Subject to any disclaimer, the term of this patent is extended or adjusted under 35 U.S.C. 154(b) by 610 days.

(21) Appl. No.: 11/181,429

(22) Filed: Jul. 14, 2005

(65) Prior Publication Data

US 2006/0285440 A1 Dec. 21, 2006

Related U.S. Application Data

(60) Provisional application No. 60/587,803, filed on Jul. 14, 2004.

(51) Int. Cl.
*G08B 13/00* (2006.01)

(52) U.S. Cl.
USPC ............ 340/541; 340/568.2; 340/545.6; 340/568.4; 250/227.14; 250/227.16

(58) Field of Classification Search
USPC ............ 340/568.2, 568.4, 540, 541, 545.6, 340/550; 250/227.14, 227.16
See application file for complete search history.

(56) References Cited

U.S. PATENT DOCUMENTS

| | | | |
|---|---|---|---|
| 4,235,346 A * | 11/1980 | Liggett | 220/7 |
| 4,972,175 A | 11/1990 | MacPherson | |
| 5,289,785 A | 3/1994 | MacPherson | |
| 5,299,273 A * | 3/1994 | Evans | 385/77 |
| 5,539,379 A | 7/1996 | MacPherson | |
| 5,959,568 A * | 9/1999 | Woolley | 342/42 |
| 6,995,353 B2 | 2/2006 | Beinhocker | |
| 6,995,669 B2 | 2/2006 | Morales | |
| 7,098,444 B2 | 8/2006 | Beinhocker | |
| 7,211,783 B2 * | 5/2007 | Beinhocker | 250/227.14 |
| 7,271,723 B2 * | 9/2007 | Ando | 340/545.6 |
| 7,332,728 B2 | 2/2008 | Beinhocker | |
| 7,394,060 B2 | 7/2008 | Beinhocker | |
| 7,428,924 B2 | 9/2008 | Patel | |
| 7,576,653 B2 | 8/2009 | Smith | |

(Continued)

FOREIGN PATENT DOCUMENTS

| | | |
|---|---|---|
| GB | 2098770 A | 11/1982 |
| JP | 408164932 * | 6/1996 |
| WO | 9826388 | 6/1998 |

OTHER PUBLICATIONS

U.S. Appl. No. 60/535,449, filed Jan. 9, 2004, Beinhocker, Gilbert.

(Continued)

*Primary Examiner* — Steven Lim
*Assistant Examiner* — Hongmin Fan
(74) *Attorney, Agent, or Firm* — Guntin & Gust, PLC; Ralph Trementozzi

(57) ABSTRACT

A design and manufacturing methods for reusable, stackable shipping containers made from composite materials is described. The composite material is embedded with optical fibers, data and electrical paths, and various types of components. These embedded devices are capable of detecting intrusions through the container walls, securely storing and processing information, and securely communicating information to other containers and to remote devices.

22 Claims, 9 Drawing Sheets

(56) References Cited

U.S. PATENT DOCUMENTS

| | | | |
|---|---|---|---|
| 2001/0035410 A1* | 11/2001 | Taube et al. | 220/1.5 |
| 2003/0057131 A1* | 3/2003 | Diaferia | 206/719 |
| 2004/0046660 A1* | 3/2004 | Ando | 340/545.6 |
| 2005/0073406 A1* | 4/2005 | Easley et al. | 340/539.1 |
| 2005/0275537 A1* | 12/2005 | Kerr et al. | 340/568.2 |
| 2006/0164239 A1* | 7/2006 | Loda | 340/539.22 |
| 2007/0001844 A1* | 1/2007 | Krill | 340/545.1 |
| 2008/0237485 A1 | 10/2008 | Beinhocker | |

OTHER PUBLICATIONS

Letter from Stanley Schurgin dated Sep. 21, 2009.

* cited by examiner

COMPOSITE ANTI-TAMPER CONTAINER WITH EMBEDDED DEVICES

RELATED APPLICATION

This application claims the benefit of priority to U.S. Provisional Application No. 60/587,803, filed Jul. 14, 2004, entitled "Composite Anti-Tamper Container with Embedded Devices".

STATEMENT OF GOVERNMENT RIGHTS

This invention was made with Government support under contract No. N66001-05-C-6014 awarded by SPAWAR Systems Center San Diego. The Government may have certain rights in this invention.

FIELD OF THE INVENTION

The invention relates to containers, in particular, to containers that include embedded devices within the walls of the containers.

BACKGROUND

Based on recent domestic and foreign events, governments and the commercial sector have become concerned with the potential importing and exporting of weapons of mass destruction by terrorists or other similar organizations. By accessing a standard shipping container, a weapon such as a nuclear weapon may be placed in the container and passed undetected through a port or other import/exporting facility.

In general, approximately sixteen million twenty foot containers are in used throughout the world. Additionally, approximately 40% of the personnel that load and off-load these containers come from nations that are on the terrorist list. Bribery and sabotage are common throughout the shipping industry, including government officials, shipping companies and freight forwarders. Large quantities of contraband material now pass through the maritime commerce into most ports in the US.

This disclosure relates to a method of manufacturing, distributing, and utilizing shipping containers such that they may be monitored for unauthorized access. The disclosure also relates to methods of utilizing shipping containers that improve shipping processes and may provide a savings in the cost of transportation, increased control, faster throughput, and reduction of losses due to pilferage.

SUMMARY OF THE INVENTION

The disclosure provides a robust, practical, and secure shipping container with container walls constructed of composite materials in which sensors and processors are embedded.

In one embodiment, to meet the primary sensing objectives of breach detection, the container walls are built of composite materials that contain a grid of embedded fiber optic data paths and optical sensors. Using a container constructed according to the present invention, a hole on any of the six faces of the container larger than a predetermined detectable size, for example, 9 square inches, can be detected immediately when the hole is cut, under circumstances of light or darkness and under any loading condition. In an alternative form, the container wall contains plugs into which processors and other sensors could be inserted, thereby providing a completely modular approach that can be upgraded as new technology becomes available. The processor or processors, using modular standard interfaces, manage the sensors, alerting, external communications, and security functions.

According to another preferred embodiment, the sensors and processors of a stack of composite containers are interconnected and a data path and optionally an electrical path is formed by the interconnected containers, so that a system that includes the stacked composite containers is able to count the number of containers and detect the interposition of a rogue container that lacks conforming communication information and status information from that container, and distribute electrical power to other containers as well.

DETAILED DESCRIPTION OF THE EMBODIMENTS

This disclosure describes a container device with container walls containing sensors for detecting intrusion into the walls and/or other portions of the container device. According to one aspect, the container is preferably constructed from light but strong vacuum-infused sandwich composite materials that contain embedded fiber optic data paths and optical sensors that detect intrusions in any of the six faces of the container.

Figure 1:
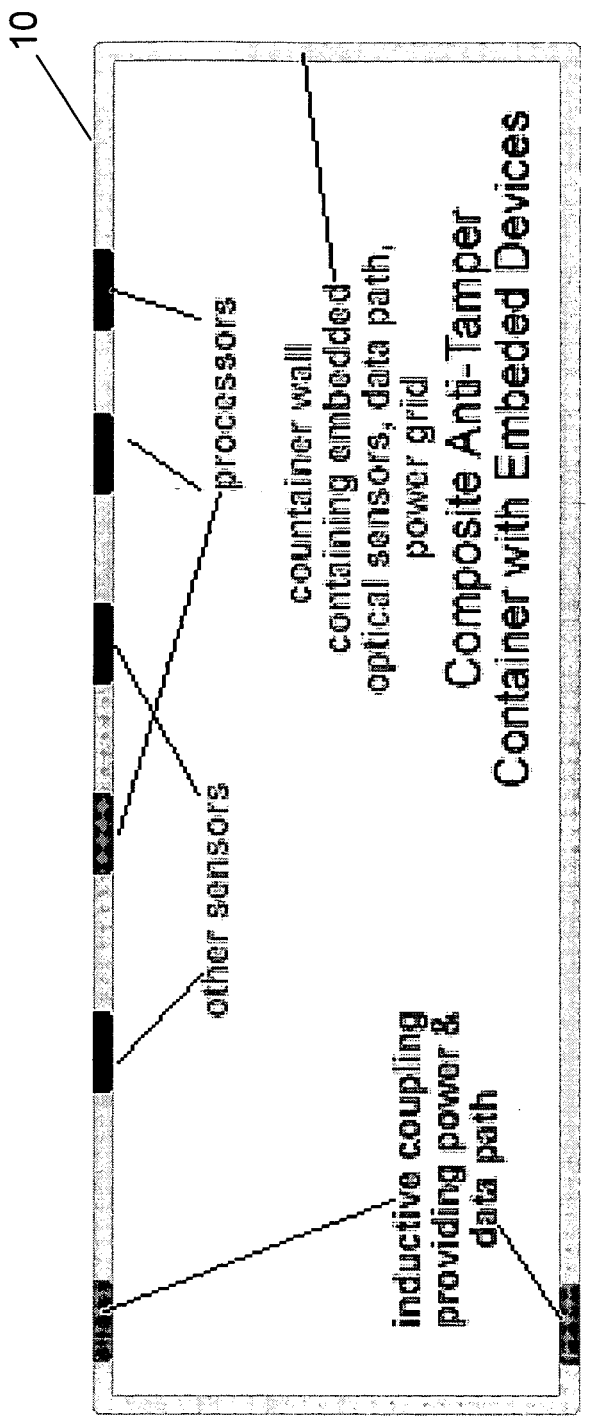
FIG. 1 diagrammatically illustrates four side walls of a composite container with embedded sensors, processors, and other devices.

Referring to FIG. 1, four side walls of a composite container 10 are schematically illustrated. The container walls are frameworks into which processors and sensors may be inserted. The processor and sensor type and the density of the processors and sensors in the container walls can be customized to meet a user's needs. Furthermore, in some designs, electrical paths and data paths and various data processing elements such as Complex Programmable Logic Devices (CPLDs) and/or Field Programmable Gate Arrays (FPGAs) or similar elements may be incorporated to provide control and communication functionality. Additionally, to provide energy for these and similar sensors and elements, a power source such as a battery or rechargeable battery may also be embedded in the composite material.

In one arrangement, composite container 10 is constructed to have a shape and size similar to a standard steel shipping container so that the composite container can be used interchangeably with these steel shipping containers. Additionally, composite container 10 may be stacked and loaded similar to existing steel containers, using conventional loading equipment.

According to one embodiment, composite container 10 may be provided with a battery, preferably a rechargeable battery, to power the embedded sensors and processors. According to another arrangement, the sensors and processors of multiple composite containers, which are stored in a stack, are interconnected and a data path is formed by the interconnected containers, so that a system that is formed by the sensors and processors of the stacked composite containers. This system of sensors and processors is able to count the number of containers and detect interposition of a rogue container that lacks conforming communication information and status information of the processors and sensors from that container. In another embodiment, the interchangeably conventional steel containers are provided with communication links and/or sensors and/or processors, so that in a stack of containers, which includes both the composite containers and the steel containers, the steel containers can intercommunicate with the composite containers, and the composite containers and the steel containers form a communication network.

The composite container with the sensors and optical mesh network ensures the integrity of the container against tampering. The system is also able to attain a relatively low false positive rate, preferably less than 0.1% per trip.

Another arrangement, a composite container includes one or more optical fibers, each having a first end at an input port in the container, and extending through container walls to a second end at an output port in the container. An optical driver having a light source is connected to one or more of the optical fibers at the input port. Upon receiving a start or activating signal (coded or uncoded), the driver causes radiation to propagate into the optical fiber at its first end at the input port. An optical detector is coupled to the output port to detect light propagating along the fiber from the input port. The two ends of optical fibers, in some forms, are coupled to switches to permit selectively input of light and detecting of light. The switches permit fibers to be pulsed under program control and allow a grid of fibers orthogonally extending (along "x" and "y" axes) in the container walls. The x axis and y axis fibers are pulsed or actuated selectively under program control, so that the integrity of the various fibers is maintained in a manner permitting detecting of fiber breaks or degradation and locating those breaks based on x and y coordinating grid with this configuration. If an intrusion interrupts or stresses an optical fiber embedded in the composite material of the container walls, the use of x and y axes of fibers locates the intrusion. In some arrangements, processors are embedded in the composite material and are electrically connected to the optical drivers. Many optical drivers may be utilized in a container constructed of the composite material.

In some arrangements, sensitivity to stress in a fiber (or in the container wall) (such as caused by an intrusion attempt) is enhanced by embedding optical sensors, such as fiber optic sensors, in the grid of optical fibers.

In still more arrangements, a grid constructed of electrical wires or paths is embedded in the composite material so that intrusions are detectable upon the wire being broken.

In another example, sensitivity to intrusion-induced stress in the container wall (or in a fiber) is enhanced by embedding stress sensors in the grid of the above referenced electrical paths. In one arrangement, these stress sensors may be incorporated to detect stresses resulting from an intrusion.

The composite material may include a reinforced polymer structure where the reinforcement includes optical fibers and optionally electrical wires or paths. For example, a composite material may be produced from a mesh of glass fibers or other fibers which has been infused, possibly by vacuum methods, with a resin bonding agent. As is known by one skilled in the art of composite materials, these composites may be implemented in many variations. In addition to sensors embedded in the walls, optical sources/drivers are used to provide energy to the system. These optical sources emit radiation down at least one fiber either continuously or pulsed, either periodic or aperiodic. The optical sources may or may not be embedded in the composite material, but typically they are. In one arrangement, the composite material is infused using a VARTM process or some other method.

The batteries for powering the sensors and the processors and the light sources are preferably rechargeable batteries, which can be periodically charged. The system is preferably provided with plenty of bandwidth and redundant processing power to fulfill the alerting, data acquisition, and communication requirements of a user.

In one arrangement, the container system is provided with a security system designed on the assumption that the container may be in the physical possession of criminals or terrorists or other persons with hostile intent. This level of security substantially exceeds security based on the assumption that outsiders are attacking a safe interior core. In one example, the security system includes software, cryptographic tokens, and other types of data that may be securely provided from a remote monitoring station.

In some arrangements, two or more of the containers in a container stack are interconnected and thus form a communication network, which may be capable of counting the number of the containers and detecting the unauthorized inserting of a rogue container into a stack of containers on a platform such as a ship.

Composite container 10 may include other sensors for detecting the opening of one or more doors, movement, extreme environmental conditions, seal status, and other conditions that may be of interest to a customer. In one arrangement, the sensors are embedded in the container walls. Alternatively, the sensors may be attached to or plugged into the container walls and may be removed from the walls. The composite containers also can be provided with RFID tags and/or RFID monitoring devices or other similar systems.

The sensors and processors in composite container 10 may be further capable of detecting a breach of any of the six walls of the container under any load conditions. The anti-breach system can be tuned to a point where the rate of false positives is acceptably low. Embedding the sensors and processors in the container wall also protects the sensors and processors both from sabotage and from the harsh maritime environment when the containers are in use. In one arrangement, the composite container walls are provided with a modular design with attaching means, for example, holes, so that additional equipment (e.g. sensors and/or processors) can be rapidly and easily attached to or plugged into the walls, to account for the development of new technologies and/or to configure the container for a specific type of cargo or a specific situation. For example, an empty container might need simpler, less expensive instrumentation than a container full of cargo.

The embedded power and data paths inside the containers preferably are accessible from external sources via inductive couplings, allowing for (a) recharging the power (batteries), (b) forming hard wired data and electrical paths, and (c) building a communication network within a stack composed entirely of composite containers, which can be used to count the number of the containers and detect the interposition of rogue containers in the stack. The security system may enable the automatic installation of different software modules immediately before a container is loaded and the use of several processors inside the container, which continuously check on one another and provide statue and feedback information.

The container, in some examples, is an integral unit that includes four walls (a front wall, two end or side walls, and a back wall), a roof (or top), a floor (or bottom). In one embodiment, the container has at least one door. According to another embodiment, the container preferably has at least two doors on one end. Again, in one arrangement, the doors include a coupling that permits the flow of optical and electrical data and electrical power to and from the doors. Additionally, or alternatively, a similar coupling may be used on the bottom of the container to permit the flow of optical and electrical data and electrical power to or from a similar (or complementary) coupling on the top of an adjacently positioned container, for example, or from a rack on which containers are stacked, or from a truck chassis on which a container is placed. Again, additionally, or alternatively, the adjacent complementary couples permit optical and/or electrical signal flow between and through various containers in a stack.

The data coupling incorporates a coupling mechanism that, if needed, withstands the harsh rigors of the maritime environment, where heavy containers may be stacked on top of one another and on truck chassis by crane. In an alternative embodiment, electrical couplings transferring power to a container by inductance is used with the container. Data is modulated over such a coupling to provide a data transfer method. For the door, optical signals/data can be coupled through butt joints of fiber optic paths, for example, or by evanescent light coupling.

Figure 2:
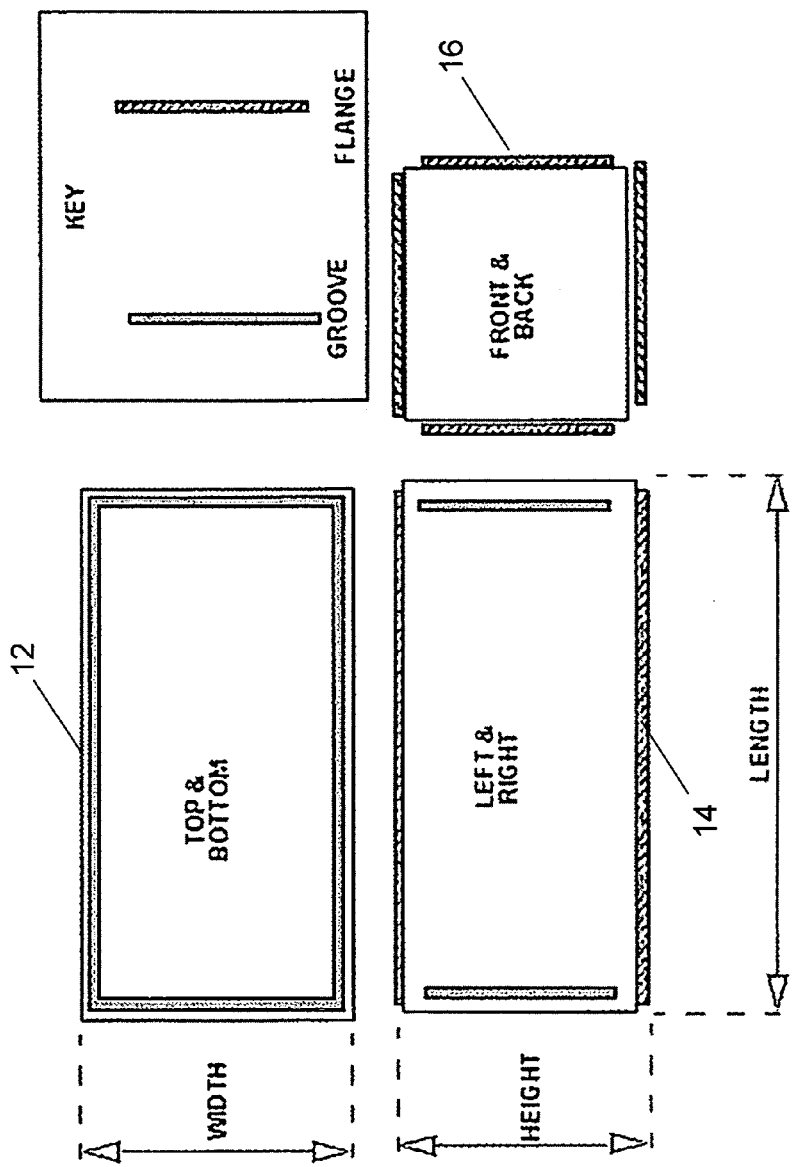
FIG. 2 diagrammatically illustrates side walls of a composite container that include grooves and flanges.

Referring to FIG. 2, in some implementations, a composite container is constructed from panels 12, 14, and 16 that are referred to as top, bottom, left side, right side, back, and front, which may be joined together so as to form a rectangular shipping container. Panels 12, 14, 16 may be of various sizes and thickness so that they can be assembled to form a shipping container, for example, that is four foot high by four foot wide by four feet long or similar dimensions or alternatively be much larger and/or thicker and be assembled to construct an International Organization for Standardization (ISO) twenty foot or forty foot containers that are commonly used in maritime commerce.

In this arrangement, the bottom and top panels contain grooves along outer edges. The left side, right side, back and front panels are constructed with corresponding flanges, so that these flanges fit snuggly into the groves. Furthermore, the left side and right side panels might also have grooves, and the back and front panels might have flanges, so that these panels may be snapped together.

A number of screws (or similar type of fastener) may be needed to provide a pre-defined strength to the assembled container. The number, placement, and size of these screws may be determined by engineering methodologies that are known to one skilled in the art. These screws may also be inserted by technicians at the point of shipping or at an earlier time.

In another arrangement, structural screws may be embedded into the panels with embedded motors, so that the panels may be capable of self-assembly into shipping containers or shipping cartons.

When one assembled container has been stacked above and snapped into a container below, additional screws may be needed to join the two containers securely together. These screws may be driven into place by a technician with an appropriate tool, or alternatively, the panels may be constructed in such a way that assembled cartons or containers may be joined together.

The groove and flange design may be utilized to provide electrical power and data paths throughout the assembled composite carton or container. This design may be extended so as to provide electrical power and data paths throughout a stack of containers or cartons.

A series of metal connectors may be embedded at the bottom of each grove and along the side channels of the grooves. At appropriate positions on the flanges, another metal connector may be embedded, so that when a flange is inserted into a groove, these connectors dig into one another and form an electrical connection.

In some arrangements, numerous connectors may be embedded along a groove so that when a flange is inserted into a groove, numerous electrical connections are produced.

Figure 3:
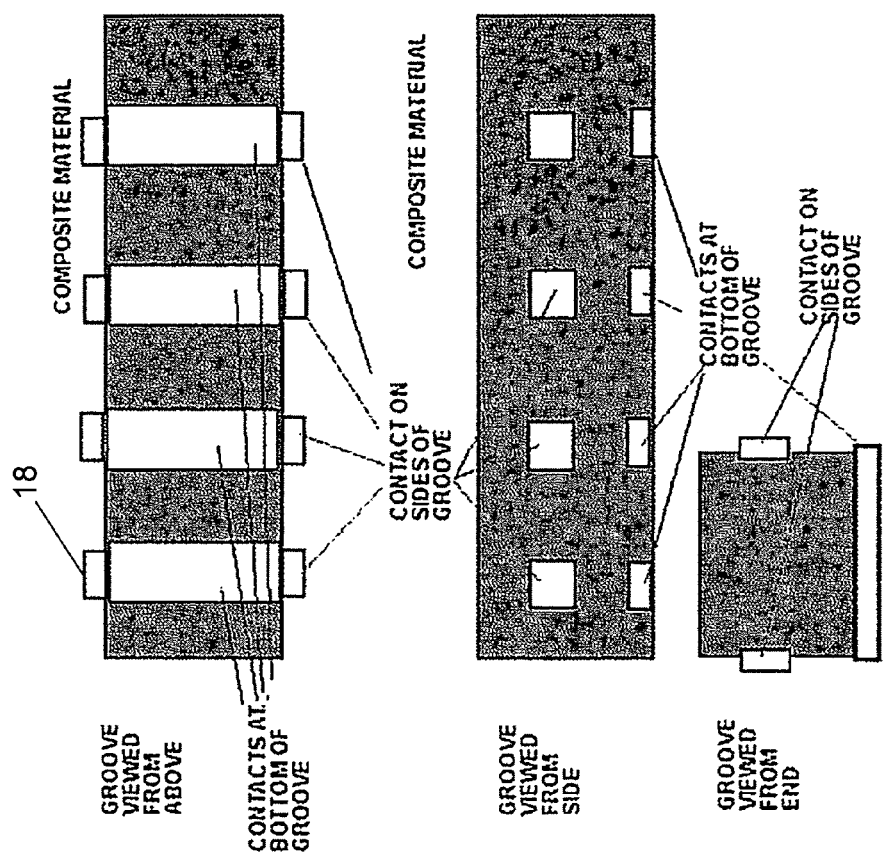
FIG. 3 diagrammatically illustrates side walls of a composite container that include embedded metal connectors.

Referring to FIG. 3, metal connectors may be positioned in various locations. For example, metal connectors (e.g., connector 18) may embedded along the sides of a groove.

Figure 4:
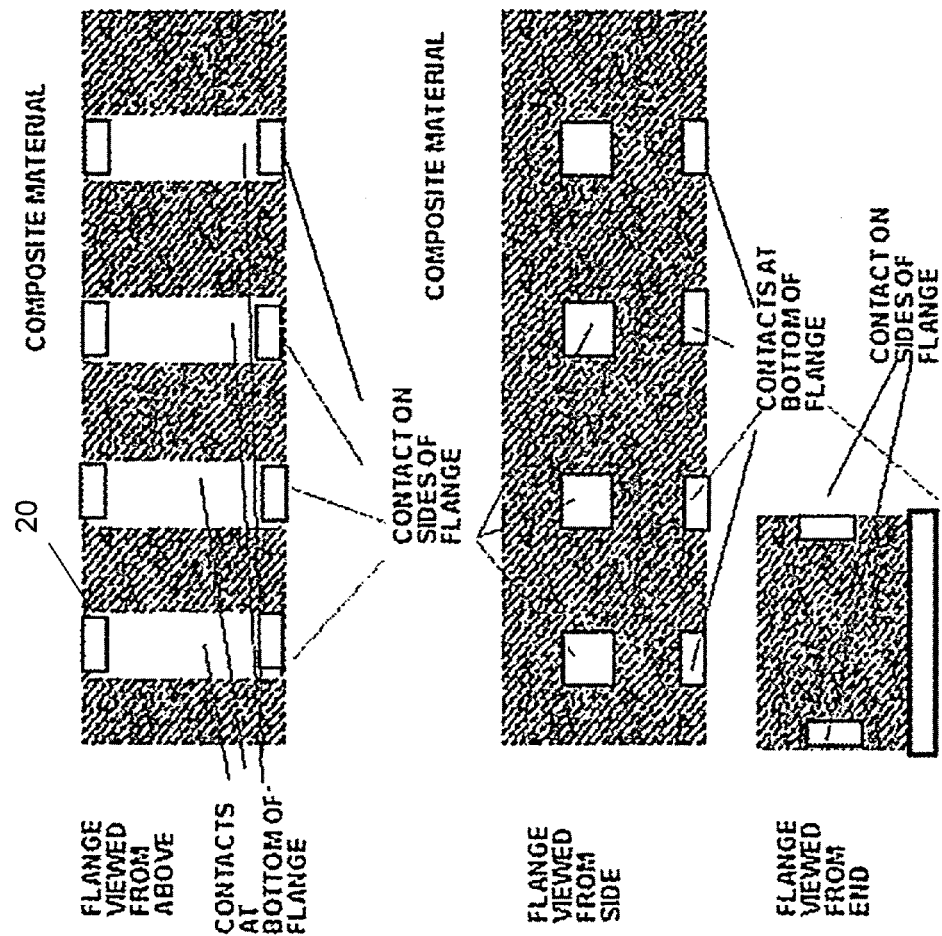
FIG. 4 diagrammatically illustrates side walls of a composite container that include embedded metal connectors.

Referring to FIG. 4, exemplary metal connectors are respectively embedded along the sides of and at the end of a flange 20. When a flange is inserted into a groove, these connectors may scrape against one another and form an electrical connection. The size of the connectors along the sides of the grove may be limited so that if a flange is not fully inserted into a groove, an electrical connection may not be completed. Due to the open connection, a signal may be produced to provide an alert that the container has not been properly assembled.

These connections may bear the full weight of containers stacked above. Weight from above may improve the connectivity of connections from the end of the flange to the bottom of the groove. Weight from above may also distort the grove, thereby potentially causing the connection provided along the side of the channel to deteriorate.

In some arrangements, this methodology is similar a Universal Serial Bus (USB) connector that is used with personal computers (PCs). Typically, the USB connector supplies both power and data. However, the USB connector may not provide the structural ruggedness needed to interface heavy components such as the containers described above.

These connections may connect to electrical leads that may extend to various control devices (CPLDs, FPGAs) embedded in the composite material of the panel. These devices should be able to determine whether the container has been properly assembled and whether there is proper connectivity throughout the device.

At various stages in maritime and air commerce, ample outside power is available and is relatively accessible. For example, during packing of the container at the factory, during transport by truck, storage on a dock, storage in a hold in a ship, electrical power may be closely located. If this power is attached to the rack on which the container was placed, then power may be supplied to recharge a battery inside the composite materials included in the container.

Figure 5:
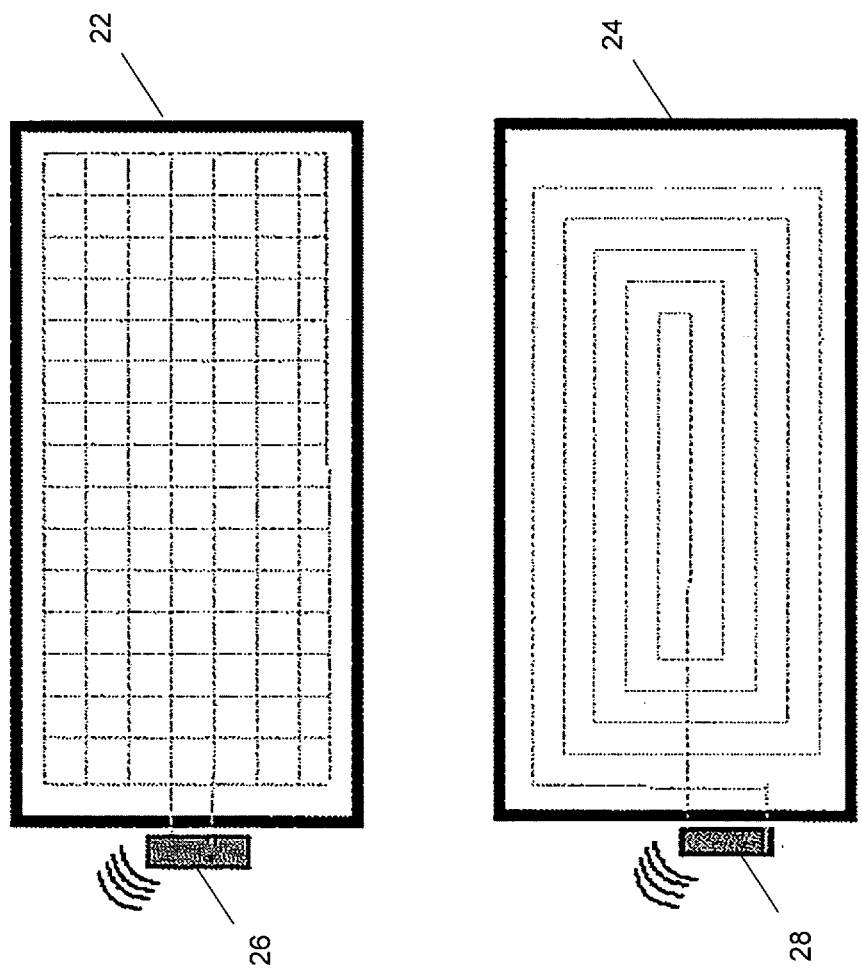
FIG. 5 diagrammatically illustrates two types of intrusion sensing grids that are embedded in side walls of a composite container.

Referring to FIG. 5, intrusions may be detected through the wall of a container by embedding optical or electrical wires. As shown in the figure, two exemplary designs are provided that extend across a portion of a container panel. One implementation includes a grid pattern 22 of optical fibers while another example implements a spiral pattern 24. Each panel may contain one or several grids optical or electrical fibers. In one arrangement, an optical or electrical path may be established through the grid, and the intrusion may be detected when the fiber or wire is broken. In some arrangements, stress sensors would be embedded in the grid, and the intrusion may be identified by the detection of a sensed stress.

As known by one skilled in the art of telecommunications and telemetry systems, wireless technology (e.g., transceivers 26 and 28) may be implemented such that a wireless signal is transmitted when an optical or electrical path is broken.

Figure 6:
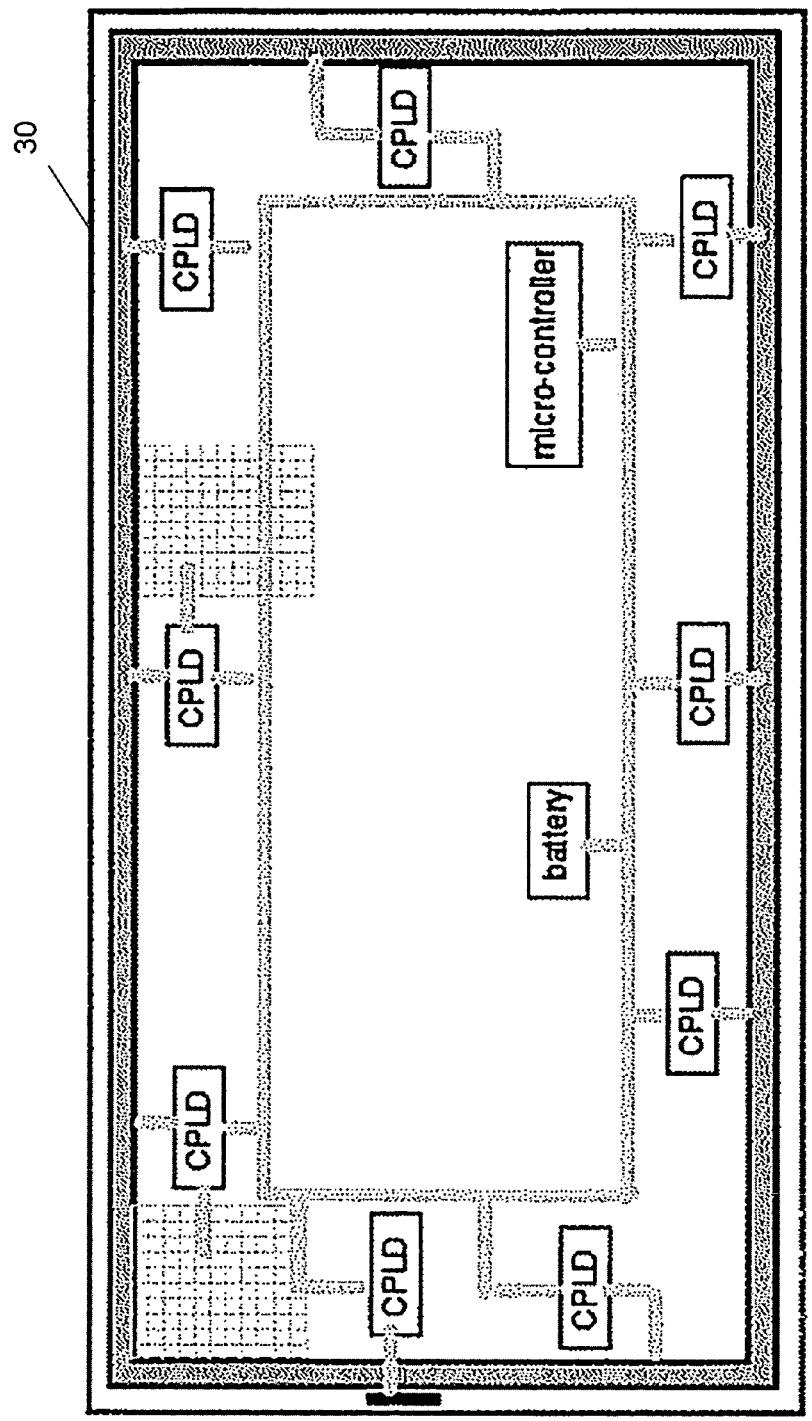
FIG. 6 diagrammatically illustrates a side wall of a composite container that includes embedded components and buses.

Referring to FIG. 6, an exemplary composite panel 30 is shown that includes a power and a data bus. As shown in the figure, a number of Complex Programmable Logic Devices (CPLDs) or similar devices may be interfaced to leads from contact points in grooves or flanges. The CPLDs may also be interfaced to various grids for intrusion detection. In this exemplary implementation a few such grids are included, however, in some arrangements the grids may extend to cover an entire panel.

In general, CPLDs are typically inexpensive and operate at relatively high clock rates. A CPLD provides an independent processing unit such that the malfunctioning of one unit does not substantially affect the processing of one or more other units. Similarly, if another processing unit malfunctions, the CPLD is not substantially affected. Consequently, CPLDs may provide an inexpensive path to provide a multiple processing capability and to allow design portions to operate independently of one another, and at different speeds. CPLDs are available that implement standard data interfaces, both hard-wired and wireless. Furthermore, some CPLDs may gate the data made available by the grooves, flanges, and intrusion grids to a data bus, from whence the data may be made available to one or more microcontrollers.

Figure 7:
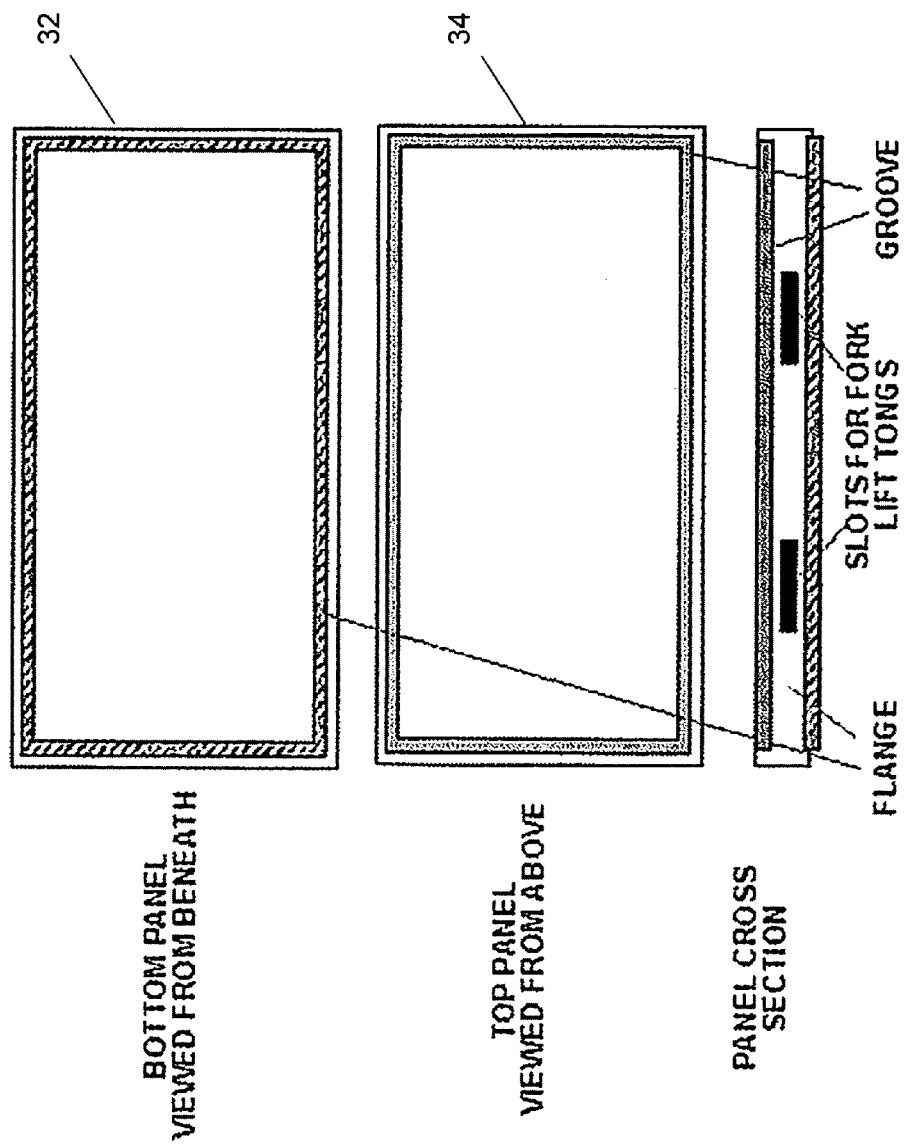
FIG. 7 diagrammatically illustrates the interconnectivity of composite containers.

Referring to FIG. 7, as mentioned above, containers (assembled from the composite panels 32 and 34) may be vertically stacked upon one another. In some arrangements, an assembled container may mate with a container positioned below by using the flange and groove design described above. By mating the stacked containers, power and/or data connections may be made between the containers so that power and/or information may be passed among hardwire or wireless paths that interconnect the stacked containers.

Figure 8:
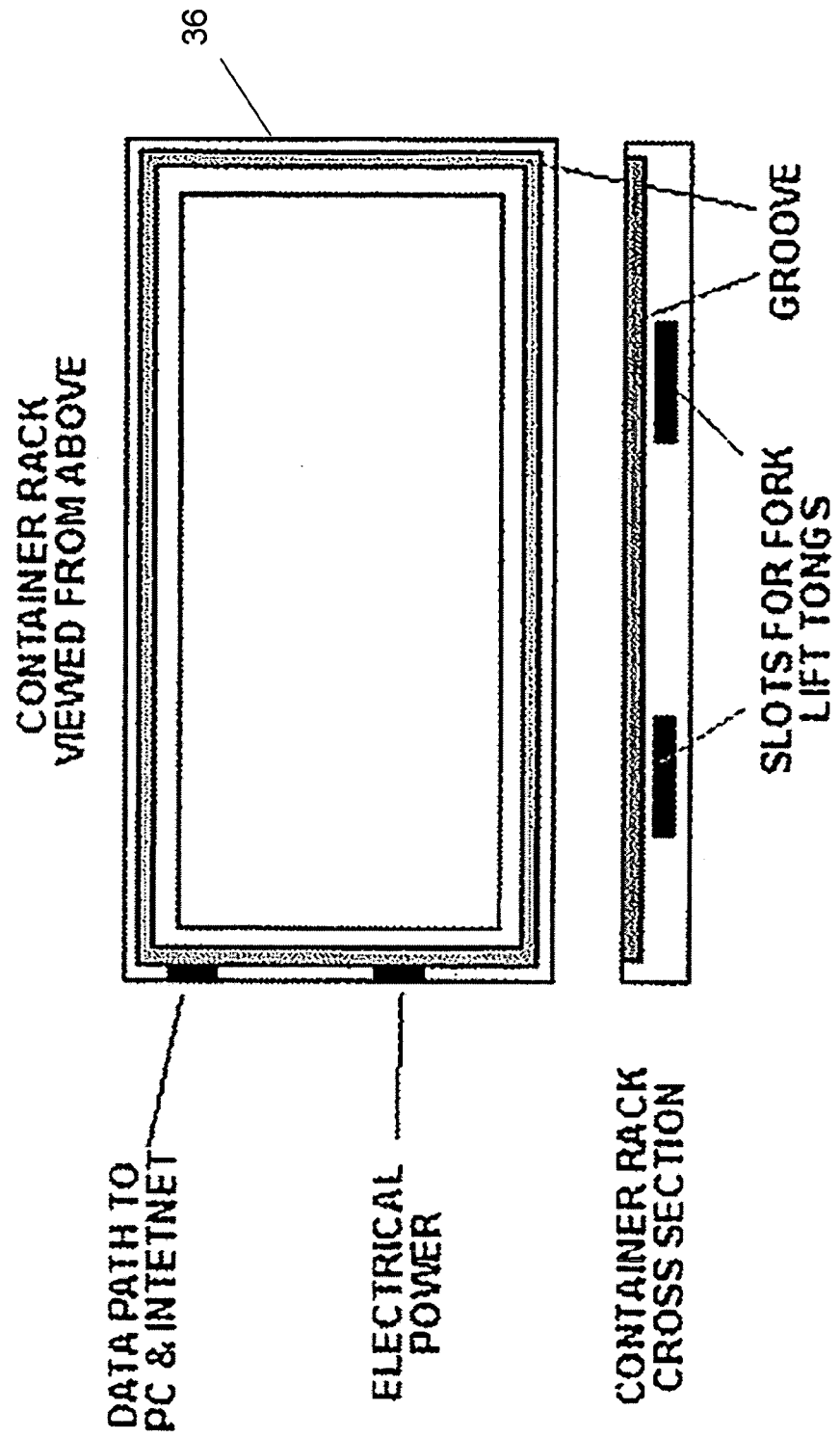
FIG. 8 diagrammatically illustrates rack-mounting a composite container.

Referring to FIG. 8, a single assembled container may be positioned and connected to a container rack 36. In some arrangements rack 36 may be connected to a PC or other similar digital device that is capable of accessing the Internet. Along with supplying Internet access, rack 36 may also supply power to the container (along with other containers). By connecting the container (or containers) to rack 36, signals and/or messages that represent a container condition (e.g., the status of the container) may be sent to a remote computer system or server.

Along with sending information to remote locations, components may be embedded in the panels of a container for storing the information for later retrieval. Furthermore, information may be uploaded to the assembled container under control of a remote server. As mentioned above, individual CPLDs may be embedded in panels, and these CPLDs may be used to inexpensively implement relatively high data rates with interfaces implementing one or multiple protocols.

Figure 9:
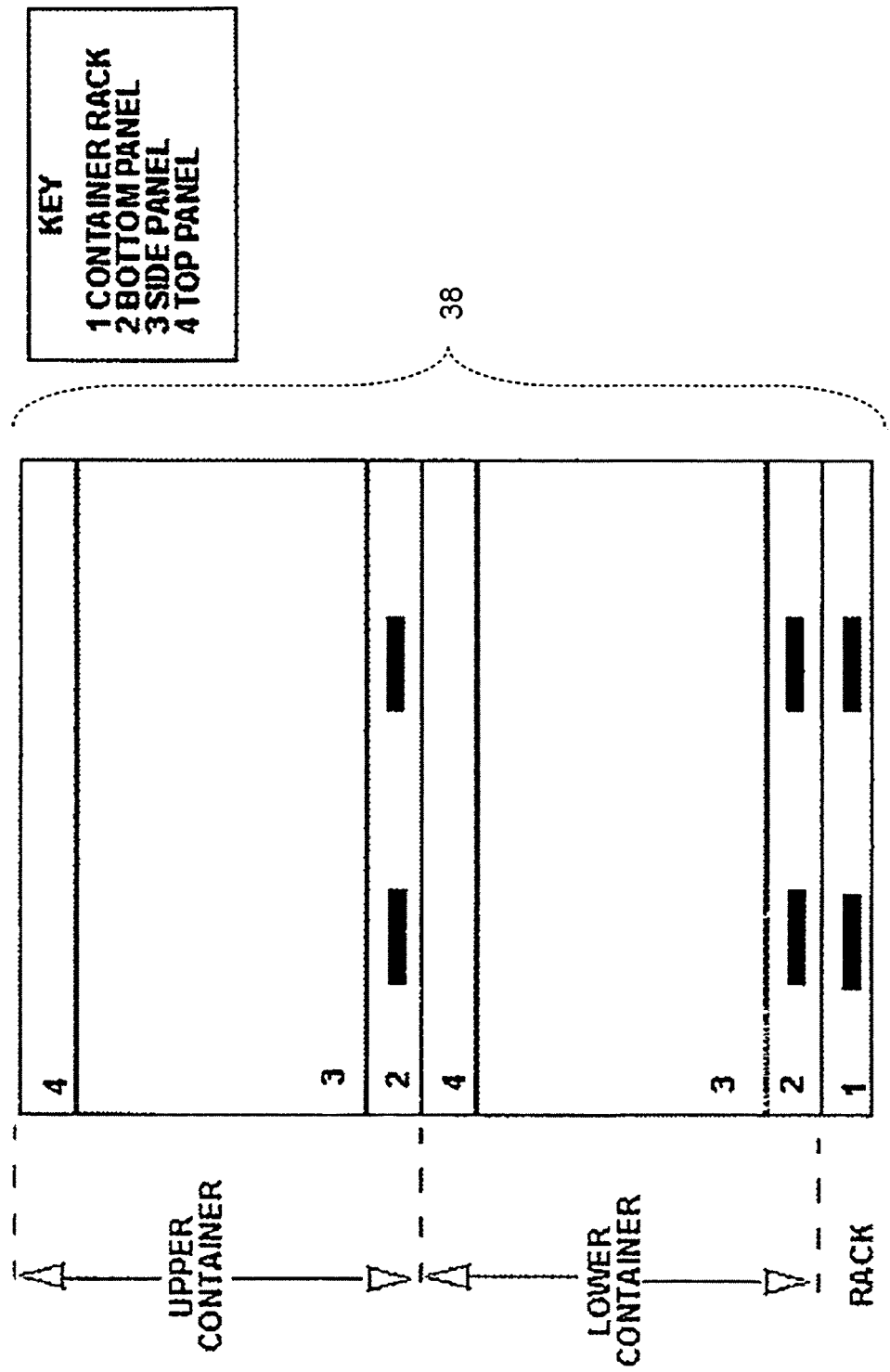
FIG. 9 diagrammatically illustrates rack-mounting a stack of composite containers.

Referring to FIG. 9, a rack 38 of stacked containers is shown in which each container is connected (directly or indirectly) to one or more remote servers (via the Internet) for sending and/or receiving information.

In one scenario, this exemplary arrangement may be used to monitor the interposition of rogue containers in a stack of containers. Rogue containers are containers that are not remotely controlled, and, for example, may contain contraband such as a nuclear weapon or toxic material. In some arrangements, a stack of containers and a rack may be designed to fit into a twenty-foot or forty-foot ISO shipping container. In this illustrative example, the containers are approximately four feet high so that a stack of two containers plus rack 38 may be inserted into a ten-foot high ISO container. If a rogue container, which is not connected to a remote server, is inserted into or positioned on top of the stack, the entire stack may not fit in the ISO container and thereby be detected. If a rouge container is interchanged with a container in the stack, due to absence of a connection with the remote server, the server may determine the present of the non-conforming container.

For a stack of ISO containers, the interposition of a non-conforming container into the middle of the stack may be relatively quickly detected by a remote controller that is connected to the stack through the Internet. Detection of a rouge container placed on top of the stack may be detected by incorporating a device (e.g., pressure sensor) that is connected to the stack and detects any non-conforming device placed on top of the stack. In other arrangements, this capability may be incorporated into the top side of composite containers used to in place of the conventional ISO shipping containers.

In some arrangements, detectors for sensing special nuclear materials may be embedded into the composite panel walls. For example, relatively inexpensive dosimetric sensors may be embedded. In some conventional systems, special nuclear materials may be shielded. However, for sufficiently small container sizes, shielding may be impractical. In contrast, an appropriate number of small individual containers with embedded dosimetric sensors may provide a useful strategy for reducing the risk of nuclear weapons being imported through a maritime transport. Under this strategy, shipments that contain cargo in volumes that might be feasible for adequate shielding of special nuclear materials may need special handling.

A system of embedded devices may also be incorporated into systems that externally scan containers with high energy particles to detect embedded nuclear materials. After a container has been externally scanned and found not to contain special nuclear materials, data representing that information can be securely entered into processors that are embedded in the composite material of the container walls. If the container is thereafter breached, this breach may be detected by the container.

In another application, after contents have been placed in a container, the container may be locked and sealed under control of a remote server. During this procedure, cryptographic material, randomly produced by the remote server may be uploaded into the container and stored in an appropriate FPGA or CPDL device embedded in one or more of the container walls.

When an unauthorized condition occurs, such as a breach of the container wall or an unscheduled opening of the container, the intrusion may be sensed by the embedded sensors internal of the container and embedded cryptographic material is partially or completely destroyed. Due to this procedure, an adversary may be unable to restore cryptographic material or determine the state of the container prior to the intrusion. Additionally, a signal or message may be sent to a remote server to indicate that an alarming condition has been detected. In some scenarios, the remote control server may ask for a hash of the previously supplied cryptographic values, to which, if an alarm has occurred, the container may be unable to supply that information.

Referring back to FIGS. 7, 8, and 9, each individual container may include slots that are capable of receiving fork lift tongs so that the containers may be moved individually or as a stack. Since, as mentioned above, the contents and condition of a container or a stack of containers may be queried by a remote computer system via an embedded or attached data interfaces, containers and stacks of containers may be moved and inventoried while being monitored.

Other types of sensors and detectors may be incorporated into a container or a stack of containers. For example, a sensor may be included that determines the weight of the container and store data that represents this weight. Alternatively, a previously sealed container may be weighed by a separate device, and this information may then stored in the container. Additionally, information such as data from dosimetric sensors, weight information, the supposed contents of the container, etc. may be fused together and processed to develop a metric to identify the likelihood that the container contains a nuclear device or other harmful contraband.

In general, commerce flows in world commerce are typically uneven, with more goods flowing in one direction that another. Consequently, the capability to ship disassembled containers is vital. Thereby, in some arrangements individual panels with embedded sensors may be shipped to particular locations (e.g., shipping ports, airports, etc.) for assembling at a later time. Since individual panels may be shipped separately, prior to assembling containers, the individual panels may be inserted into a rack for testing (e.g., pass a check-out procedure) by a remote server to determine if the panel is functioning correctly. Furthermore, composite contains may be partially or completely assembled in a rack for testing by a remote computer system to determine if the container is functioning appropriately.

A container rack may be implemented for various platforms and facilities. For example, a container rack may be designed and produced for positioning on truck chassis, a ship cargo compartment, a factory floor, etc. so that monitoring may continue during loading and off-loading periods and during transit. To provide power during these periods, the container rack may be designed to supply power (along with data connectivity) to a stack of containers (e.g. a stack of eight containers) that is held by the rack.

An advantage of embedding sensors, processors, and other devices in a hardened composite material is that the material acts as a protective coating which protects the devices from the harsh maritime environment and from tampering by an adversary. Another advantage of containers made from a hardened composite material, is that the containers can be made uniform, so that the sensitivity to intrusions and false positives will vary only slightly container to container. This approach is to be contrasted with placing intrusion sensing devices on existing containers, which do not present a uniform environment to externally applied intrusion sensing devices. Another advantage of embedding sensors in the container material is that the entire system can be tested in the factory when the container is first constructed.

In some arrangements, a container that is produced from composite material may be produced in which the sides, the roof, the floor, the front and back, and doors may be disassembled into panels and reconstructed as needed. By manufacturing and distributing panels produced from composite material, the panels may be easily assembled at a shipping site into an appropriate container size. This container, once assembled, may be lighter than a similar container made of steel, may have more strength and less susceptibility to distortion due to the application of force of other containers piled on top. Additionally, the container may be able to withstand the elements of a marine environment, and may be cost competitive. In some arrangements, multiple composite containers may be vertically stacked so that a upper-positioned container securely mates with the container located directly below. By mating containers, a portion of a stack or a complete stack of containers may be lifted and moved as a single unit. This design has the advantage of reducing the cost of shipping empty containers back to the point of origin, because the disassembled parts are more compact for shipping purposes than the empty containers. This also reduces the risk of terrorists and other adversaries hiding people or contraband in empty containers. Another advantage is that refurbishment and maintenance is possible at the panel level rather than the container level. Discrete panels can be employed or not, depending on a user's desire to trade off advantages and disadvantages (such as a container made this way might not be as strong as a container manufactured as a unit, and the additional complexity of interfacing the electrical, optical, and power paths through walls composed of separate panels, and that such a device might be more easily reverse engineered by an adversary).

In some arrangements, the composite container may include an embedded wireless fidelity (WIFI) device that is capable of communicating externally without needing to rely on optical and electrical coupling. Furthermore, in some arrangements, the composite container includes an embedded telecommunication device (e.g., a radio frequency transceiver) for communicating with a loading crane and/or other ground- (or terminal-) based equipment.

As mentioned, the composite containers may include panels that are produced from continuous material such as a composite material. However, in some arrangements the panels may include additional material along with the composite material. For example, panels may be produced that include a composite material that is sandwiched between two layers of metallic material. These metallic layers may provide additional strength and robustness while the inner layer of composite material may be used for embedded optical fiber, sensors, processors, and other types of devices and components. In some of the previously described arrangements, panels of composite material were used to produce a composite container. However, in some arrangements a uniform composite design may be implemented (e.g., molded) to produce a partially or completely monolithic structure.

What is claimed is:
1. A system, comprising:
a plurality of structural panels that define a volume of a shipping container comprising:
a first structural panel including a continuous composite material comprising a first embedded electrical power path and a first embedded data path, wherein the first structural panel in its entirety includes the composite material and wherein the first structural panel comprises a flange extending away from an outer edge of the first structural panel, wherein the flange comprises a first plurality of electrical contacts; and
a second structural panel including the continuous composite material comprising a second embedded electrical power path and a second embedded data path, wherein the second structural panel includes in its entirety the composite material and comprises a groove extending along an outer edge of the second structural panel and dimensioned to accept snuggly therein the flange of the first structural panel, wherein the groove comprises a second plurality of electrical contacts arranged such that the first plurality of electrical contacts engages the second plurality of electrical contacts upon joining of the first structural panel and the second structural panel by insertion of the flange into the groove, such that the first plurality of electrical contacts and the second plurality of electrical contacts are protected from exposure to environmental conditions;

wherein each of the first and second embedded data paths comprises at least one respective first optical fiber that is embedded within the continuous composite material of a respective one of the first structural panel and the second structural panel, wherein the at least one respective first optical fiber is configured to propagate, within the respective first optical fiber, radiation from a source connected to the at least one respective optical fiber, resulting in propagated radiation;

respective of each of the first structural panel and the second structural panel, such that respective electrical power paths and respective data paths are protected from exposure to environmental conditions;

a coupler to couple the propagated radiation by evanescent light coupling across a door included in the container;

an embedded sensor in communication with one of the respective electrical power paths and one of the respective data paths and configured to detect a variation in the radiation that is caused by an external condition imposed on the container; and a processor embedded within the continuous composite material, the processor in communication with the respective electrical power paths and the respective data paths and configured to initiate sending a signal that represents the variation.

2. The system of claim 1, wherein the embedded sensor is configured to detect the variation according to an interruption of the radiation caused by a break in the at least one respective first optical fiber.

3. The system of claim 1, wherein the embedded sensor is configured to detect the variation including a degradation of the radiation caused by a stress imposed on the at least one respective first optical fiber.

4. The system of claim 1, further comprising:
a second optical fiber embedded in the container, wherein the second optical fiber is positioned substantially orthogonal to the at least one respective first optical fiber.

5. The system of claim 1, wherein the continuous composite material comprises a reinforced polymer structure.

6. The system of claim 1, wherein a portion of at least one of the first structural panel and the second structural panel includes a continuous composite material between a metallic outer surface and a metallic inner surface, wherein the optical fiber extends through the continuous material.

7. The system of claim 1, further comprising:
a switch to pulse the propagating of the radiation in the at least one respective first optical fiber.

8. The system of claim 1, further comprising:
a rechargeable battery to provide power to the source.

9. The system of claim 1, further comprising a device embedded within the composite material and in communication with at least one of the respective electrical power paths and at least one of the respective data paths.

10. The system of claim 9, wherein the device is selected from a group consisting of: data processors; controllers; components for storing information for later retrieval; telecommunications devices; wireless fidelity (WI-FI) devices; plugs; cryptographic material; and dosimetric sensors.

11. The system of claim 9, wherein the device is selected from a group consisting of: complex programmable logic devices; field programmable gate arrays; and combinations thereof.

12. The system of claim 1, wherein each structural panel of the plurality of structural panels that define the volume of the shipping container comprises at least one of the flange and the groove allowing for assembly, disassembly, and reassembly of the shipping container.

13. The system of claim 1, further comprising inductive couplings in communication with the respective electrical power paths and the respective data paths, the inductive couplings to provide access to external sources.

14. The system of claim 1, wherein the processor comprises at least one of a complex programmable logic device and a field programmable gate array.

15. The system of claim 1, wherein the processor of the shipping containers, when stacked with another similar shipping container, is in communication with a another processor of the other similar shipping container, such that an absence of communication between the processor of the shipping container and the other processor of the other similar shipping container is indicative of an interposition of a rogue container.

16. A stacking system of shipping containers, comprising:
a plurality of stackable shipping containers that each include a plurality of structural panels that define a volume of each respective container, wherein each shipping container of the plurality of stackable shipping containers comprises:

a first structural panel including a continuous composite material, wherein the first structural panel in its entirety includes the composite material and wherein the first structural panel comprises a flange extending away from an outer edge of the first structural panel, wherein the flange comprises a first plurality of electrical contacts;

a second structural panel including the continuous composite material, wherein the second structural panel in its entirety includes the composite material and comprises a groove extending along an outer edge of the second structural panel and dimensioned to accept snuggly therein the flange of the first structural panel, wherein the groove comprises a second plurality of electrical contacts arranged such that the first plurality of electrical contacts engages the second plurality of electrical contacts upon joining of the first structural panel and the second structural panel by insertion of the flange into the groove, such that the first plurality of electrical contacts and the second plurality of electrical contacts are protected from exposure to environmental conditions;

a respective plurality of optical fiber grids that are respectively embedded within each portion of the continuous composite material of each of the first structural panel and the second structural panel, wherein each optical fiber grid is configured to propagate, within the respective plurality of optical fiber grids, radiation from at least one source respectively connected to the optical fiber grid, resulting in propagated radiation;

a coupler to couple the propagated radiation by evanescent light coupling across a door included in at least one shipping container of the plurality of stackable shipping containers;

respective electrical power paths and respective data paths respectively embedded within each portion of the continuous composite material of each of the first structural panel and the second structural panel, such that the respective electrical power paths and the respective data paths are protected from exposure to environmental conditions;

a coupling configured to permit a flow of one or more of optical signals of the respective plurality of optical fiber grids, electrical power of the respective electrical power paths and electrical data of the respective data paths between shipping containers when arranged in a stack;

a plurality of embedded sensors in communication with the respective electrical power paths and the respective data paths, wherein the plurality of embedded sensors are respectively embedded in each portion of the continuous composite material and configured to detect a variation in the radiation that is caused by an external condition imposed on the respective container, wherein sensors of the plurality of embedded sensors are configured to pass data that represents the variation among each other; and a respective processor embedded within the continuous composite material, the respective processor in communication with the respective electrical power paths and the respective data paths and configured to initiate sending a signal that represents the variation.

17. The stacking system of shipping containers of claim 16, wherein the external condition comprises an interruption in communication caused by a rogue shipping container positioned in the stack.

18. The stacking system of shipping containers of claim 16, wherein the external condition comprises damage caused to at least one optical fiber included in one of the respective plurality of optical fiber grids.

19. The stacking system of shipping containers of claim 16, wherein the external condition comprises stress that is detectable by at least one sensor of the plurality of embedded sensors by way of at least one optical fiber included in one of the respective plurality of optical fiber grids.

20. The stacking system of shipping containers of claim 16, further comprising a container rack configured to support the plurality of stackable shipping containers when arranged in a stack and to supply electrical power to the plurality of shipping containers when so arranged.

21. A system, comprising:

a plurality of substantially monolithic shipping containers, each shipping container of the plurality of substantially monolithic shipping container comprising:

a first structural portion implemented with a composite material, wherein the first structural portion in its entirety includes the composite material and wherein the first structural portion comprises a flange extending away from an outer edge of the first structural portion, wherein the flange comprises a first plurality of electrical contacts; and a second structural portion implemented with the composite material, wherein the second structural portion in its entirety includes the composite material and comprises a groove extending along an outer edge of the second structural portion and dimensioned to accept snuggly therein the flange of the first structural portion, wherein the groove comprises a second plurality of electrical contacts arranged such that the first plurality of electrical contacts engages the second plurality of electrical contacts upon joining of the first structural portion and the second structural portion by insertion of the flange into the groove, such that the first plurality of electrical contacts and the second plurality of electrical contacts are protected from exposure to environmental conditions;

at least one respective optical fiber that is embedded within the composite material, wherein the at least one respective optical fiber is configured to propagate, within at least one respective optical fiber, radiation from a source connected to the at least one respective optical fiber, resulting in propagated radiation;

a coupler to couple the propagated radiation by evanescent light coupling across a door included in at least one container of the plurality of substantially monolithic shipping containers;

respective electrical power paths and respective data paths embedded within the composite material of each of the first structural portion and the second structural portion, such that the respective electrical power paths and the respective data paths are protected from exposure to environmental conditions;

an embedded sensor in communication with one of the respective electrical power paths and one of the respective data paths and configured to detect a variation in the radiation that is caused by an external condition imposed on the shipping container; and a processor embedded within the composite material, the processor in communication with the respective electrical power paths and the respective data paths and configured to initiate sending a signal that represents the variation.

22. The system of claim 21, wherein the embedded sensor is configured to detect the variation according to an interruption of the radiation caused by a break in the at least one respective optical fiber.

* * * * *